F. J. FRIEDLEIN.
SILO.
APPLICATION FILED FEB. 9, 1918.
1,275,148.
Patented Aug. 6, 1918.
2 SHEETS—SHEET 2.
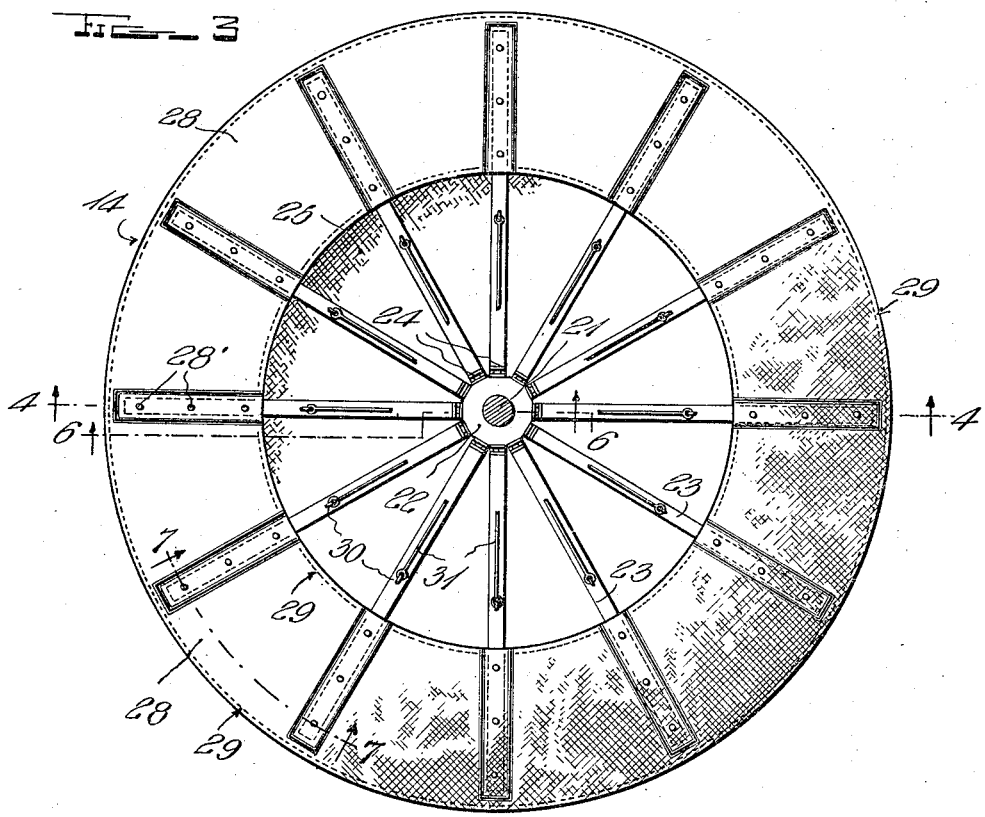
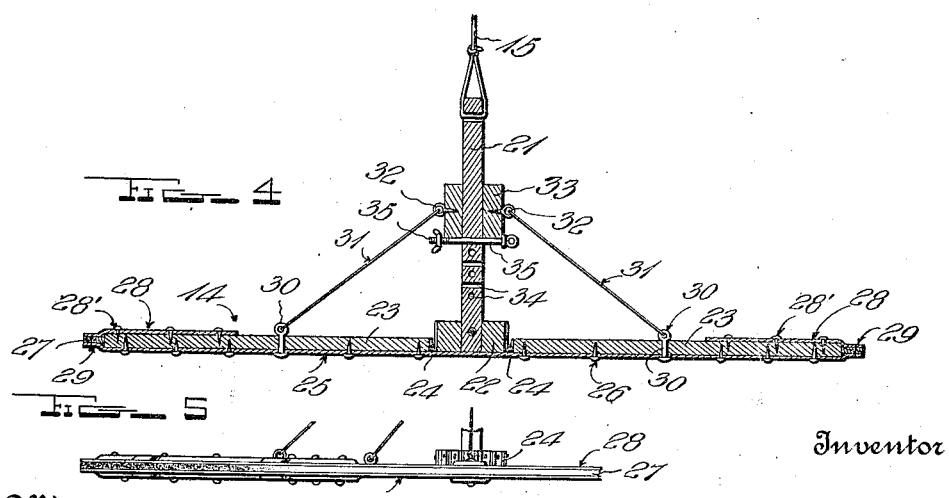
Witness
Inventor
F. J. Friedlein
By H. B. Willson & Co.
Attorneys

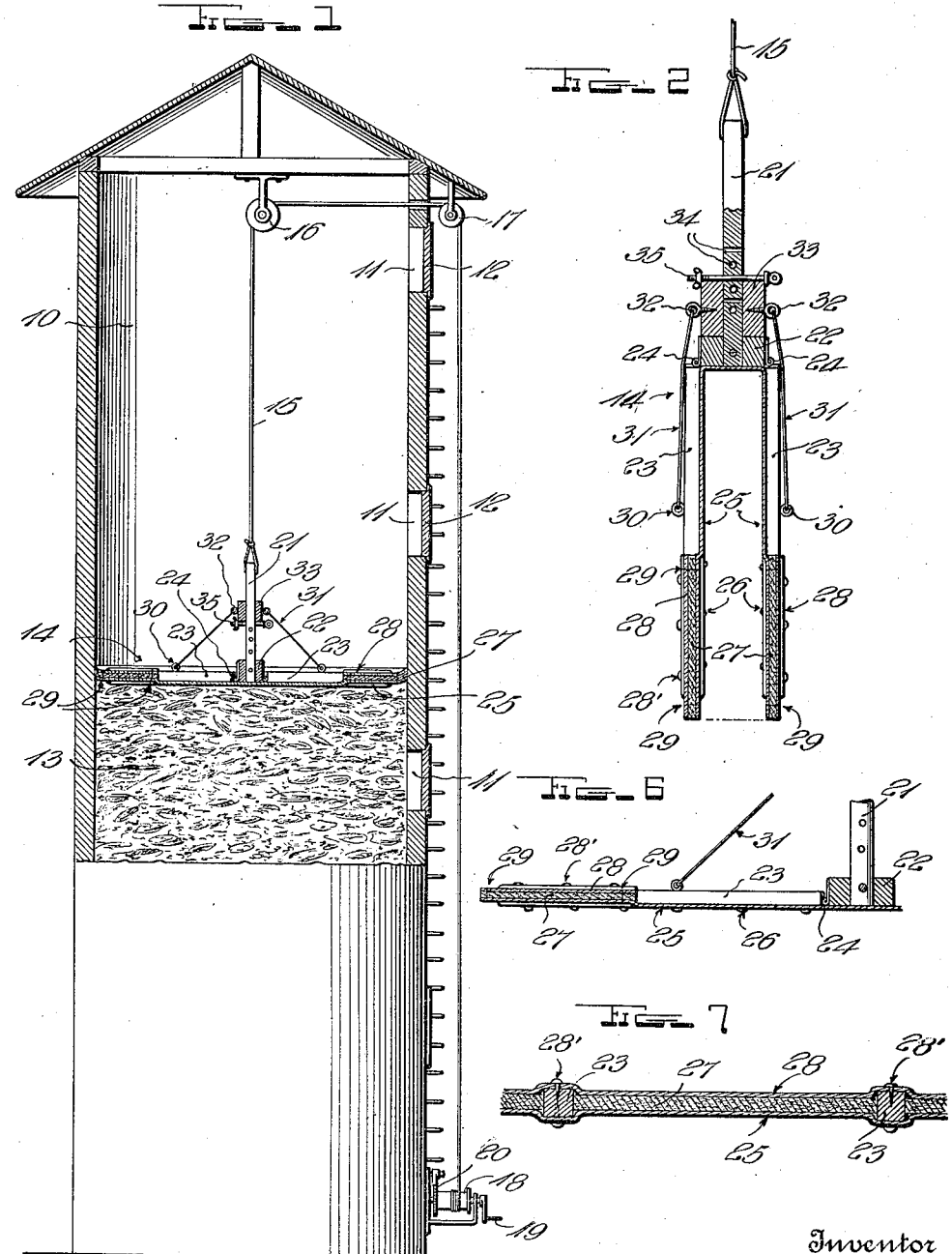

UNITED STATES PATENT OFFICE.

FRED J. FRIEDLEIN, OF GUTTENBERG, IOWA, ASSIGNOR OF ONE-HALF TO LOUIS SCHROEDER, OF GUTTENBERG, IOWA.

SILO.

1,275,148. Specification of Letters Patent. Patented Aug. 6, 1918.

Application filed February 9, 1918. Serial No. 216,415.

*To all whom it may concern:*

Be it known that I, FRED J. FRIEDLEIN, a citizen of the United States, residing at Guttenberg, in the county of Clayton and State of Iowa, have invented certain new and useful Improvements in Silos; and I do declare the following to be a full, clear, and exact description of the invention, such as will enable others skilled in the art to which it appertains to make and use the same.

This invention relates to silos, and it relates more particularly to an improved ensilage cover.

One of the objects of this invention is to provide an improved ensilage cover which fits snugly against the vertical sides of the silo and rests upon the ensilage for preventing the moisture and gases from rising and escaping from the mass of ensilage, thereby retaining the heat in the ensilage and preventing the same from freezing and adhering to the walls of the silo and subsequently being wasted.

Another object of the invention is to provide for supplying the greatest amount of protection to the ensilage at the edge of the mass or at the wall of the silo.

Another object is to provide an improved ensilage cover, that is collapsible, so as to obtain the maximum convenience in placing it in and removing it from a silo through the ports or doors thereof.

Another object is to provide an improved ensilage cover that is adjustable so as to completely cover the ensilage in silos of different horizontal areas.

Another object is to provide an ensilage cover that collapses automatically when the same is raised from the ensilage by the windlass or the like device from without the silo.

Another object is to provide a device of this character which combines the attainment of the foregoing objects with simplicity, convenience, comparative inexpensiveness, thorough practicability and maximum efficiency.

Other objects and advantages may become apparent to persons who read the following details of description in connection with the accompanying drawings in which:

Figure 1 is a view partly in section and partly in elevation illustrating my improved ensilage cover as applied to the ensilage in the silo;

Fig. 2 is an enlarged vertical sectional view illustrating the ensilage cover separate from the silo and in its collapsed condition;

Fig. 3 is an enlarged horizontal sectional view through the standard and other supporting elements of the cover, the main body of the cover being shown in plan;

Fig. 4 is a vertical sectional view taken substantially along the line 4—4 of Fig. 3;

Fig. 5 is a fragmental detail view illustrating a portion of the cover in elevation;

Fig. 6 is a vertical sectional view taken substantially along the line 6—6 of Fig. 3; and, Fig. 7 is a still more enlarged fragmental sectional view taken along the line 7—7 of Fig. 3.

According to the experience of men who have used silos, it is only the part of the ensilage adjacent to the wall of the silo which is subject to freezing, and the depth to which ensilage freezes varies from a fraction of an inch to a number of inches. When ensilage is thus frozen, it is not in condition to be fed to stock, and moreover, it is troublesome and involves a waste of time in dislodging the frozen ensilage from the wall of the silo. Therefore, when thus frozen, a portion of the ensilage adheres to the wall of the silo until it subsequently thaws, falls, dries out and loses its food value, thereby resulting in a very considerable waste of animal food. In order to prevent this waste, I provide an ensilage cover which is impervious to moisture and to the heated gases which rise in the mass of ensilage, this cover fitting snugly against the wall or walls of the silo and confining such heated moisture and gases within the mass of ensilage, thereby effectually preventing freezing of the ensilage in the most severe winter weather.

Referring now to the drawings in detail, in which similar reference characters correspond with similar parts throughout the several views, the silo 10 may be of any ordinary construction, and therefore, it is not described in detail further than to refer to the ports 11 which are provided with any suitable closures 12. The ensilage is indicated at 13, and the ensilage cover is indicated as a whole at 14 in Fig. 1 of the drawings.

The cover 14 may have a rope or other flexible element 15 secured thereto, and this flexible element may pass over pulleys or sheave wheels 16 and 17 and thence to a windlass indicated at 18. A handle 19 may be provided for turning the windlass and thereby raising and lowering the cover 14, and a suitable pawl and ratchet mechanism 20 may be provided for holding the cover above the lower portion 11 so that the ensilage material may be placed in the silo without interference by the ensilage cover.

In order that the ensilage cover may be placed in previously built silos without the necessity for altering these silos, I find it expedient, convenient and advantageous to construct the covers so that they may be collapsed as indicated in Fig. 2. In thus constructing the ensilage covers, I provide a central post or standard 21, and to the lower end of this standard I secure a hub or bearing member 22. A plurality of bars or stays 23 are pivotally connected at 24 to the hub 22 and extend radially from the latter when the device is open or extended, but depend from the hub 22 when the device is collapsed. The pivotal connections 24 may be in the form of hinges constructed from flexible materials such as canvas or leather, or they may be made of such metal that is not detrimentally affected by the moisture which might escape around the cover.

Upon the bars or stays 23 I secure a sheet of flexible fabric 25 such as rubberized or oiled cloth or other material which is impervious to the rising moisture and gases, the coppered or galvanized nails or other suitable fastening elements 26 being employed for securing the flexible sheet to the bars 23.

Between adjacent radial bars 23, I place any appropriate heat-insulating material 27. Upon the top of the bars 23 I place an annular strip 28 of textile fabric which may also be rubberized or oiled canvas if desirable, and fastening means 28' are also employed for securing the sheets or strip 28 to the bars 23.

The heat-insulating material, as well as the strip 28, extends a comparatively short distance inward from the ends of the bars 23, as it is only necessary to apply the greatest amount of protection around the edge of the mass of ensilage, the single thickness of oiled or rubberized canvas 25 being sufficient at the central portion of the mass. However, each of the elements 25, 27 and 28 extend beyond the ends of the bars 23 and are secured together by suitable means indicated at 29 in Figs. 2, 3 and 4. This construction provides a yieldable and yet comparatively thick cushion-like margin extending entirely around the outer edge of the cover. In the present instance, the cover is circular, so as to fit snugly against the cylindrical inner surface of the silo, but it is obvious that a cover of this construction would also fit against the wall of a silo which is polygonal in horizontal section. It is also obvious that in order to fit a polygonal silo having any given number of sides, the number of bars 23 may correspond to the number of sides of the silo. It will be seen, moreover, that this adjustable cover may be only partially collapsed, so that the diameter is reduced from the maximum, and the cover may therefore be snugly fitted within silos of smaller horizontal area than the maximum area which may be covered by this improved adjustable cover. In thus fitting the cover to smaller silos than the maximum size for which it is intended, the ensilage may have its top formed into conical or pyramidal shape, so that the upwardly converging under surface of the cover, may fit snugly upon the mass of ensilage; but when the cover is fitted within the maximum sized silo for which it is intended, the bars 23 extend radially from the lower end of the standards 21, and lie in a common horizontal plane.

In order that the bars 23 may be held in the different positions described in the foregoing paragraph, I provide each of these arms with an eye-bolt 30, and I provide a link or flexible element 31 for each of the eye-bolts 30 and secure one end of each element 31 to one of these eye-bolts. The upper end of each element 31 is connected at 32, by suitable means, to a sleeve 33 which is slidable upon the standard 21, and it is obvious that by adjusting the sleeve 33 on the standard 21, the bars 23 are correspondingly adjusted to different positions from radial to approximately horizontal with relation to one another. In order to hold the sleeve 33 in its different adjusted positions, I provide the standard 21 with a plurality of apertures 34, and a bolt 35 may extend through one or the other of these apertures and thus coöperate with the standard 21 in holding the sleeve 33 in its uppermost position shown in Fig. 4, its lowermost position shown in Fig. 2, or in any one of several intermediate positions.

From the foregoing description it is believed to be obvious that I have invented an ensilage cover of such merit as to make it very popular among users or dealers in such devices.

Although I have described this embodiment of my invention in minute detail, it is to be understood that my invention is not limited to these exact details, but that I am entitled to make such alterations that do not constitute a departure from the inventive idea disclosed herein.

What I claim as my invention is:

1. A collapsible device comprising a standard, a plurality of bars, means whereby said bars are movably connected to said standard at its lower end; a textile fabric sheet secured to said bars and movable therewith to and from the folded and open positions, a sleeve slidable longitudinally of said standard, a plurality of flexible elements each connecting one of said bars to said sleeve, and means coöperative with said sleeve and standard and flexible elements for holding the cover in its open position below the lower end of the standard.

2. A collapsible ensilage cover adapted to fit against and around the inner surface of a silo wall and comprising a standard, a plurality of bars, means whereby said bars are movably connected to said standard, a textile fabric sheet secured to said bars and movable therewith to and from the folded and open positions, and heat insulating material secured to said textile fabric sheet and extending beyond the free ends of said bars.

3. A collapsible ensilage cover adapted to fit against and around the inner surface of a silo wall and comprising a standard, a plurality of bars, means whereby said bars are movably connected to said standard, a textile fabric sheet secured to said bars and movable therewith to and from the folded and open positions, a second sheet of textile fabric, and heat-insulating material secured to and between the first said textile fabric sheet and the said second sheet of textile fabric.

4. A cover adapted to fit against and around the inner surface of a silo wall and comprising a sheet of material which is impervious to moisture, and heat-insulating material secured to the edge portion of the first said sheet and extending around the margin thereof and terminating between the central and marginal parts of the first said sheet.

5. A collapsible cover adapted to fit against and around the inner surface of a silo wall and comprising a sheet of flexible material which is impervious to moisture, and heat-insulating material secured to the marginal portion of the first said sheet and extending from the margin toward the center of the first said sheet and terminating between said margin and center.

6. A collapsible cover adapted to fit against and around the inner surface of a silo wall and comprising a sheet of flexible material which is impervious to moisture, a second sheet of flexible material secured to the marginal portion of the first said sheet and extending from the margin toward the center and terminating between said margin and center, and heat-insulating material confined between the first and second said sheets.

7. A collapsible cover adapted to fit against and around the inner surface of a silo wall and comprising a sheet of flexible material which is impervious to moisture, heat-insulating material secured to the marginal portion of the first said sheet and extending from the margin toward the center of the first said sheet and terminating between said margin and center, and a plurality of bars secured to said sheet in such movable relation to one another as to hold the latter stretched and permit it to be folded.

8. A collapsible cover adapted to fit against and around the inner surface of a silo wall and comprising a sheet of flexible material which is impervious to moisture, heat-insulating material secured to the marginal portion of the first said sheet and extending from the margin toward the center of the first said sheet and terminating between said margin and center, and a plurality of bars secured to said sheet and radiating from the center thereof and movable with relation to one another so as to hold said sheet stretched and allow it to be folded in folds that radiate from its center.

9. A collapsible cover adapted to fit against and around the inner surface of a silo wall and comprising a sheet of flexible material which is impervious to moisture, heat-insulating material secured to the marginal portion of the first said sheet and extending from the margin toward the center of the first said sheet and terminating between said margin and center, said sheet and heat-insulating material extending a considerable distance beyond the ends of said bars.

10. A collapsible device comprising a standard, a plurality of bars, means whereby said bars are movably connected to said standard, a textile fabric sheet secured to said bars and movable therewith to and from the folded and open positions, a sleeve slidable longitudinally of said standard, a plurality of flexible elements each connecting one of said bars to said sleeve, and means coöperative with said sleeve and standard and flexible elements for holding the cover in its open position, said standard also comprising means whereby said device may be elevated and may be automatically folded in the operation of elevating the same.

11. An expansible and contractible ensilage cover adapted to fit against and around the inner surface of a silo wall and comprising a standard, a plurality of bars arranged to extend radially with relation to said standard, means whereby an end of each of said bars is so connected to the lower end of said standard that it may swing from its radial position to a depending position relative to the lower end of said standard, flexible sheet material secured to said bars and extending throughout their length, and means for holding each of said bars in different positions between its radial position and its depending position.

12. An expansible and contractible ensilage cover adapted to fit against and around the inner surface of a silo wall and comprising a standard, a hub secured to the lower end of said standard, a plurality of bars pivotally connected to said hub and adapted to swing on their pivots from a radial relation into different convergent relations with respect to said hub, flexible sheet material secured to said bars and extending inward and outwardly from the ends thereof, and means for holding said bars in different convergent relations.

In testimony whereof I have hereunto set my hand in the presence of two subscribing witnesses.

FRED J. FRIEDLEIN.

Witnesses:
IRENE KAHLE,
CHAS. E. SCHOLZ.